United States Patent Office 2,730,258
Patented Jan. 10, 1956

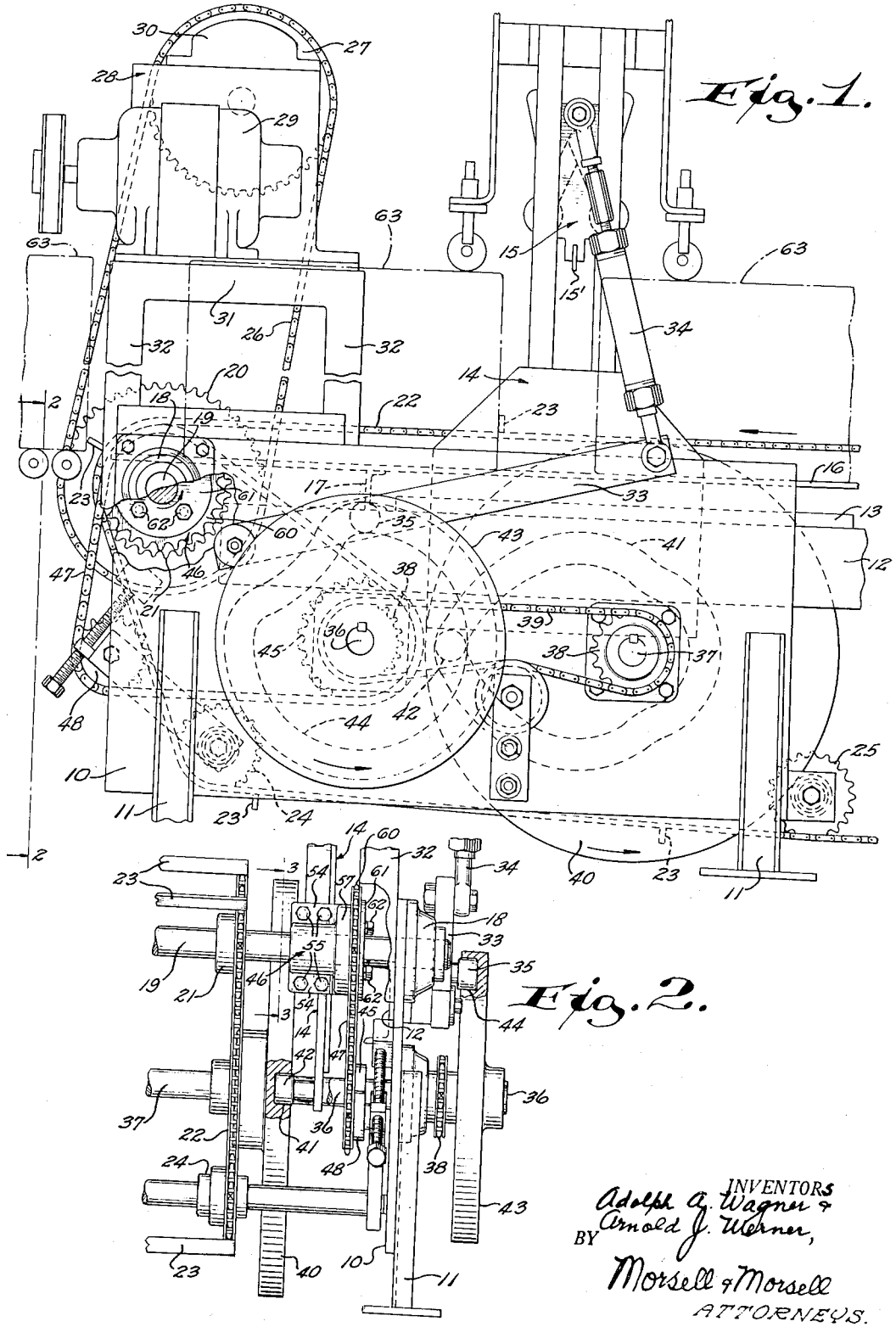

2,730,258

IMPROVEMENTS IN TAPING MACHINE CONVEYOR AND CUTTER HEAD SYNCHRONIZING MECHANISM

Adolph A. Wagner, Milwaukee, and Arnold J. Werner, Elm Grove, Wis.

Application December 12, 1951, Serial No. 261,211

1 Claim. (Cl. 216—22)

This invention relates to improvements in taping machine conveyor and cutter head synchronizing mechanism.

Copending application of Adolph A. Wagner, Arnold J. Werner, and William R. Ross, Serial No. 154,782, filed April 8, 1950, now Patent No. 2,653,727, granted September 29, 1953, discloses a taping machine wherein a carton advancing conveyor moves in timed relationship with the movement of a reciprocatably mounted cutter head. In the machine disclosed in the application referred to, the actuating mechanism for the cutter head is chain driven from the same shaft as the conveyor. In order to change the timed relationship between the operation of the conveyor and that of the cutter head, it is necessary to disconnect the drive chain for the cutter head actuating mechanism and to move said chain one or more teeth on one of its sprockets. This method of timing adjustment has the disadvantage of requiring that the chain be disconnected, and also, it has no provision for making fine adjustments.

With the above in mind it is a general object of the present invention to provide an improved taping machine or the like having a carton advancing conveyor and a reciprocatable cutter head which operate in predetermined timed relationship, said machine being provided with means for readily and infinitely varying the timed relationship between the movement of the conveyor and that of the cutter head assembly.

A further object of the invention is to provide an improved taping machine or the like of the class described wherein the conveyor and the cutter head assembly are positively driven by a common drive shaft, there being an adjustable sprocket in the drive for the cutter head assembly permitting variation in the timed relationship between the movement of the cutter head and that of the conveyor without requiring disconnection of the chain.

A further object of the invention is to provide an improved sprocket for use in taping machines or the like, said sprocket being adapted to be releasably fixed to a shaft in a selected position of rotation, release of said sprocket permitting rotation thereof to another selected position of rotation relative to said shaft.

A further object of the invention is to provide an improved sprocket of the class described having a hub which is adapted to be rotatably adjustably fixed to a shaft, and having a ring gear coaxial with and rotatably adjustably fixed to said hub to provide a two-way adjustment of the position of said gear relative to the shaft.

A further object of the invention is to provide an improved sprocket of the class described which may be easily installed on machines presently in use as well as on new machines.

A further object of the invention is to provide an improved sprocket of the class described which is strong and durable, which is relatively easy to manufacture, and which is otherwise well adapted for the purposes described.

With the above and other objects in view, the invention consists of the improved taping machine or the like and all of its parts and combinations, as set forth in the claim and all equivalents thereof.

In the drawings accompanying and forming a part of this specification, wherein is shown one complete embodiment of the preferred form of the invention, and wherein like characters of reference indicate the same parts in all of the views:

Fig. 1 is a fragmentary side elevational view of the improved taping machine, parts being broken away;

Fig. 2 is a fragmentary transverse vertical sectional view taken approximately along the line 2—2 of Fig. 1;

Figure 3:
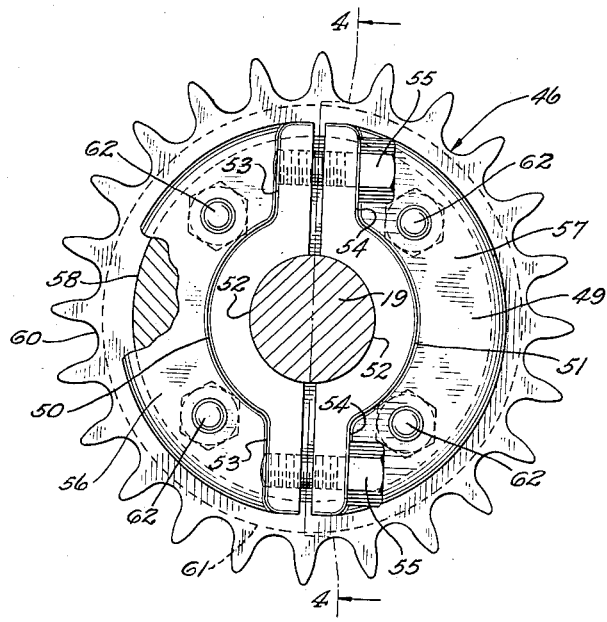
Fig. 3 is a vertical sectional view taken approximately along the line 3—3 of Fig. 2 and on a larger scale.

Referring more particularly to Fig. 1 of the drawings, the improved taping machine has a pair of substantially identical spaced parallel side frames 10, each of which may be provided with a pair of supporting legs 11. While only one side of the improved taping machine is shown and described, it will be understood that there are substantially identical corresponding parts on the opposite side of the machine. Fixed to the inner surface of the side frame 10 is a longitudinally extending horizontal channel member 12 on the upper surface of which is mounted a rail 13. A carrier assembly 14 is mounted for slidable longitudinal reciprocatable movement on the rails 13, and a cutter head 15 having a transversely extending blade 15′ is mounted for vertical reciprocating movement on the carrier 14. A horizontal plate 16 extends longitudinally of the machine substantially centrally thereof and spaced below the cutter head 15. The plate 16 is suitably supported, as by one or more transverse channels 17 which rest on the longitudinal frame members 12.

The side frames 10 are provided at one end with suitable bearings 18 for rotatably supporting a transverse main drive shaft 19 which has keyed to one end thereof a sprocket 20. A pair of sprockets 21 are fixed to the shaft 19 on opposite sides of the plate 16, and endless chains 22 extend around the sprockets 21 as shown. The chains 22, along with equally spaced transversely extending flight bars 23 connecting said chains, form an endless flight conveyor, the upper stretch of which is spaced above and extends parallel with the plate 16. The chains 22 also extend around a pair of idler sprockets 24 and 25, as well as around other suitable idler sprockets (not shown).

The sprocket 20 is connected by an endless chain 26 with the driving sprocket 27 of a source of power 28 which may take the form of an electric motor 29 provided with a speed reduction unit 30. The motor 29 is mounted on a platform 31 which is supported at each side by a pair of spaced vertically extending legs 32, which in turn are connected to the inner surface of the side frames 10 as shown.

Pivotally connected at one end to a side frame 10 is a lever arm 33 having its opposite end pivotally connected to one end of a link 34. The opposite end of the link 34 is pivotally connected to the vertically reciprocable cutter head assembly 15. A cam roller 35 is mounted on and projects laterally from an intermediate portion of the lever arm 33.

A pair of longitudinally spaced transversely extending shafts 36 and 37 are mounted in suitable bearings in the frame members 10 and have substantially identical sprockets 38 fixed thereon. An endless chain 39 connects the sprockets 38 on the shafts 36 and 37, to cause simultaneous identical rotation of said shafts. A cam 40 is fixedly mounted on the shaft 37 inwardly of the frame 10, and is formed with a cam groove 41 on its outer surface. A cam roller 42 is mounted on the lower end of the carrier 14 and projects into the groove 41, said groove being formed in a manner to produce a predetermined longitudinal reciprocation of the carrier 14 in response to rotation of the cam 40. A circular cam 43 is keyed onto the shaft 36 outwardly of the frame 10, and is formed on its inner surface with a cam groove 44. The cam roller 35 on the lever 33 projects into the cam groove 44, and the conformation of said groove is such that a predetermined vertical reciprocation of the cutter head assembly 15 is produced in response to rotation of the cam 43.

A sprocket 45 is keyed onto the shaft 36 inwardly of the frame 10. A sprocket 46 is normally fixed on the shaft 19 coplanar with the sprocket 45, and an endless chain 47 connects the sprockets 46 and 45 and may also extend around a tensioning idler sprocket 48 as shown.

The sprocket 46 includes a hub 49 which is preferably formed of a pair of substantially identical shells 50 and 51. The shells 50 and 51 are formed with complementary semi-cylindrical grooves 52 for receiving the shaft 19, and said shells are also preferably formed with diametrically oppositely projecting flanges 53 and 54 respectively. The flanges 53 and 54 are normally in spaced parallel relationship. The flanges 54 are apertured to receive screws 55 which project therethrough and are threaded into the flanges 53.

The shells 50 and 51 are formed at one end with complementary radially projecting semi-circular flanges 56 and 57. Each has an end portion of reduced diameter 58 to provide a semi-annular shoulder 59 (see Fig. 4). An annular ring gear or sprocket 60, having an internal diameter substantially equal to the diameter of the flange portions 58, is positioned on said portions in abutment with the semi-annular shoulders 59. The axial thickness of the ring gear 60 is slightly greater than the axial thickness of the portions 58 of reduced diameter, so that the ring gear 60 projects axially beyond the end of the portions 58.

Figure 4:
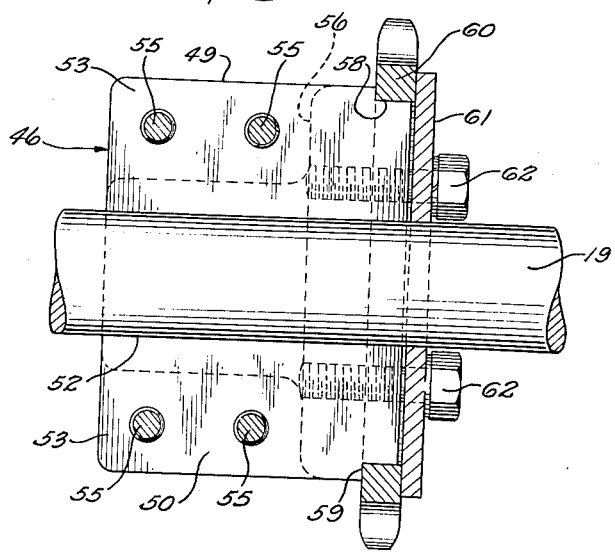
Fig. 4 is a vertical sectional view taken approximately along the line 4—4 of Fig. 3.

A clamping member 61, which may take the form of a centrally apertured circular plate, is positioned in coaxial abutment with the projecting end portion of the ring gear 60. The plate 61 is formed with apertures to receive cap screws 62 which, in turn, are threaded into the flanges 56 and 57 as shown in Figs. 3 and 4. The screws 55 are adapted to releasably clamp the hub 49 to the shaft 19 in a selected position of rotation relative thereto, and the screws 62, through the clamping plate 61, are adapted to releasably clamp the ring gear 60 in a selected position of rotation relative to the hub 59.

In the operation of the improved taping machine, the source of power 28, through the chain 26, drives the shaft 19 in the direction indicated in Fig. 1 to thereby move the conveyor 22 in the direction indicated. Through the chains 47 and 39 the shafts 36 and 37 and cams 43 and 40 are rotated in the direction indicated. The conveyor 22 is adapted to move cartons 63 along the plate 16, and the cutter head 15 is adapted to be successively positioned in and withdrawn from the successive spaces between adjacent moving cartons by the action of the cams 43 and 40.

Satisfactory operation of the mechanism requires a high degree of synchrony between the movement of the cutter head 15 (both vertically and longitudinally) and the movement of the conveyor 22. The timed relationship between the movement of the cutter head 15 and that of the conveyor 22 can be readily varied by adjusting the position of rotation of the ring gear 60 relative to the shaft 19. This can be accomplished in two ways.

The screws 55 may be loosened to permit rotation of the entire sprocket 46 on the shaft 19 to the desired new position, after which the screws 55 are tightened to clamp the sprocket to the shaft in said position. Alternatively, the screws 62 may be loosened to permit rotation of the ring gear 60 on the hub 49 to a selected new position, after which the screws 62 are again tightened to fixedly clamp the gear 60 to the hub 49. The adjustments provided by the sprocket 46 permit highly accurate timing of the movement of the cutter head 15 with respect to that of the conveyor 22, and the construction of the sprocket 46 is such as to permit such adjustment to be easily and quickly accomplished without the requirement of disconnection of any of the chains.

Various changes and modifications may be made without departing from the spirit of the invention, and all of such changes are contemplated as may come within the scope of the claim.

What is claimed as the invention is:

In a carton taping machine including a horizontally movable conveyor to continuously advance spaced, aligned cartons, and having means for applying tape to the tops and ends of said cartons as they are spacedly moved through the machine, a horizontally reciprocatable cutter head carrier, and a cutter head vertically reciprocatably mounted on said carrier; a drive shaft having thereon normally fixed first and second sprockets, an endless chain engaged by the first sprocket for driving the conveyor at a constant speed, means for horizontally reciprocating the cutter head carrier, other means for vertically reciprocating the cutter head, and an endless chain engaged by the second sprocket and extending to the carrier reciprocating means and cutter head reciprocating means, said second sprocket including a hub formed with a central bore receiving said drive shaft, said hub being split axially into two complementary shells, a screw extending through one of said shells and threaded into the other shell for drawing the shells together about said shaft to cause said shells to fixedly clamp said shaft in said hub bore in a selected fixed position of rotation relative to said shaft, said hub being rotatable relative to said shaft upon release of said screw, the hub having a plurality of coplanar radially projecting teeth engaged by said endless chain, the selective rotation of said hub on its shaft providing for selective variation in the timed relationship of movements between the cutter head carrier and cutter head and the conveyer to insure reciprocating movements of the cutter head into and out of spaces between pairs of advancing cartons.

References Cited in the file of this patent
UNITED STATES PATENTS

| | | |
|---|---|---|
| 1,729,427 | Kovacs | Sept. 24, 1929 |
| 1,787,458 | Swenson | Jan. 6, 1931 |
| 2,112,443 | Martoccio | Mar. 29, 1938 |
| 2,359,403 | Burt | Oct. 3, 1944 |
| 2,382,740 | Noffsinger | Aug. 14, 1945 |
| 2,436,694 | Hornbrook et al. | Feb. 14, 1948 |
| 2,568,028 | Redmond | Sept. 18, 1951 |
| 2,586,903 | Badenhausen et al. | Feb. 26, 1952 |
| 2,643,016 | Steckling | June 23, 1953 |